United States Patent
Suh et al.

(10) Patent No.: US 9,001,930 B2
(45) Date of Patent: Apr. 7, 2015

(54) DUAL-STREAM SIGNAL (SIG) FIELD ENCODING WITH HIGHER ORDER MODULATION

(71) Applicant: FutureWei Technologies, Inc., Plano, TX (US)

(72) Inventors: Junghoon Suh, Kanata (CA); Osama Aboul-Magd, Kanata (CA); Kwok Shum Au, Shenzhen (CN)

(73) Assignee: FutureWei Technologies, Inc., Plano, TX (US)

( * ) Notice: Subject to any disclaimer, the term of this patent is extended or adjusted under 35 U.S.C. 154(b) by 0 days.

(21) Appl. No.: 13/771,356

(22) Filed: Feb. 20, 2013

(65) Prior Publication Data

US 2013/0216002 A1    Aug. 22, 2013

Related U.S. Application Data

(60) Provisional application No. 61/601,297, filed on Feb. 21, 2012, provisional application No. 61/660,505, filed on Jun. 15, 2012.

(51) Int. Cl.
*H04L 27/20* (2006.01)
*H04L 27/26* (2006.01)
*H04L 1/06* (2006.01)

(52) U.S. Cl.
CPC ........ *H04L 27/2602* (2013.01); *H04L 27/2613* (2013.01); *H04L 1/0643* (2013.01)

(58) Field of Classification Search
USPC ................... 375/260, 267, 308; 370/203–211
See application file for complete search history.

(56) References Cited

U.S. PATENT DOCUMENTS

| | | | |
|---|---|---|---|
| 2010/0111220 A1* | 5/2010 | Rouquette-Leveil et al. | 375/295 |
| 2010/0316094 A1* | 12/2010 | Tung | 375/150 |
| 2011/0038332 A1* | 2/2011 | Liu et al. | 370/329 |
| 2011/0096796 A1 | 4/2011 | Zhang et al. | |
| 2012/0020261 A1 | 1/2012 | Van Zelst et al. | |
| 2012/0039198 A1* | 2/2012 | Yang et al. | 370/252 |
| 2013/0235737 A1* | 9/2013 | Merlin et al. | 370/252 |

OTHER PUBLICATIONS

Park, M., "IEEE P802.11 Wireless LANs Proposed Specification Framework for TGah," approved in 802.11ah Interim Meeting, Jan. 19, 2012, Jacksonville, FL USA, 12 pages.

Porat, R., et al., "32FFT Interleaver IEEE 802.11-12/0113r0" [Power Point slides] submitted Jan. 19, 2016, 13 pages.

"IEEE Standard for Information technology—Telecommunications and information exchange between systems Local and metropolitan area networks—Specfic requirements Part 11: Wireless LAN Medium Access Control (MAC) and Physical Layer (PHY) Specifications," IEEE Std 802.11™-2012 (Revision of IEEE Std 802.11-2007), Mar. 29, 2012, 2793 pages.

(Continued)

*Primary Examiner* — Curtis Odom
(74) *Attorney, Agent, or Firm* — Slater & Matsil, L.L.P.

(57) ABSTRACT

Signal (SIF) field capacity can be significantly increased by encoding SIG field data using two streams in accordance with a space-time block code (STBC) encoding scheme. Dual-stream SIG field encoding allows for the utilization of higher order modulation schemes, such as quadrature phase-shift keying (QPSK), which increases SIG field capacity. Dual-stream encoded SIG fields are transmitted using an omnidirectional beam to allow mobile stations to accurately decode the SIG field irrespective of their spatial location.

21 Claims, 8 Drawing Sheets

(56) References Cited

OTHER PUBLICATIONS

"IEEE Standard for Information technology—Telecommunications and information exchange between systems Local and metropolitan area networks—Specfic requirements Part 11: Wireless LAN Medium Access Control (MAC) and Physical Layer (PHY) Specifications Amendment 4: Enhancements for Very High Throughput for Operation in Bands below 6 GHz," IEEE P802.11ac™/D5.0, Jan. 2013, 440 pages.

"IEEE Standard for Information technology—Telecommunications and information exchange between systems Local and metropolitan area networks—Specfic requirements Part 11: Wireless LAN Medium Access Control (MAC) and Physical Layer (PHY) Specifications," IEEE Draft P802.11-REVmb™/D12, Nov. 2011, 2910 pages.

"IEEE Standard for Information technology—Telecommunications and information exchange between systems Local and metropolitan area networks—Specfic requirements Part 11: Wireless LAN Medium Access Control (MAC) and Physical Layer (PHY) Specifications," Amendment 4: Enhancements for Very High Throughput for Operation in Bands below 6 GHz, IEEE P802.11ac™/D2.0, Jan. 2012, 359 pages.

* cited by examiner

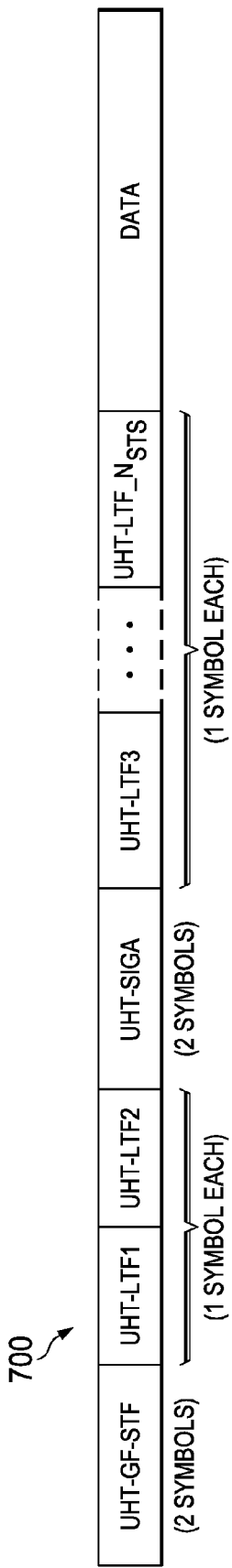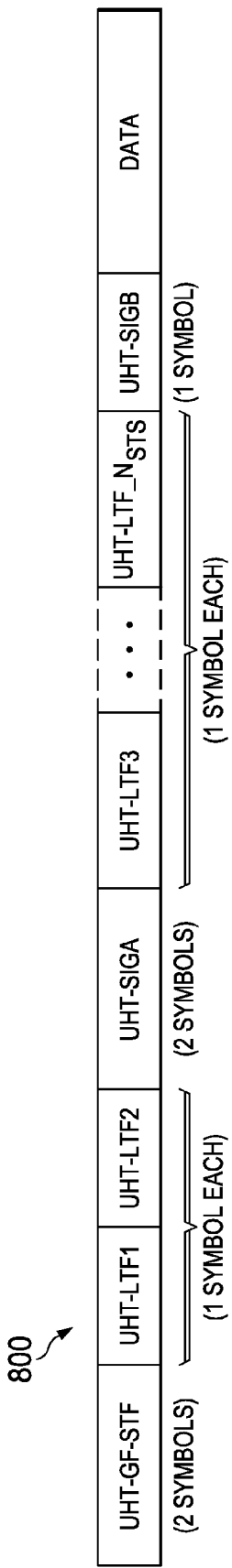

1 RX CASE

2 RX CASE

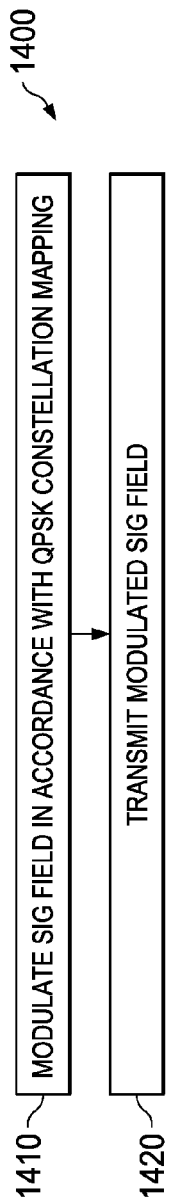
FIG. 14
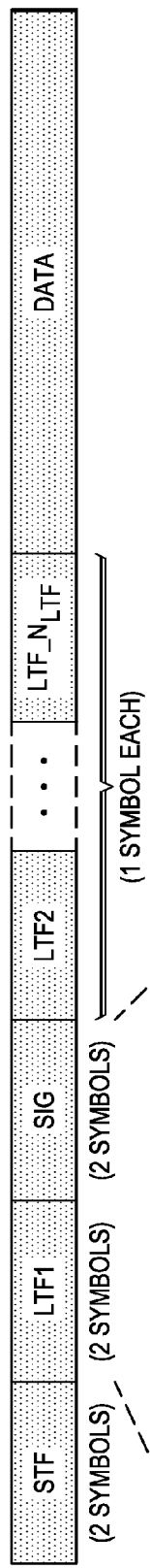
FIG. 15
(PRIOR ART)
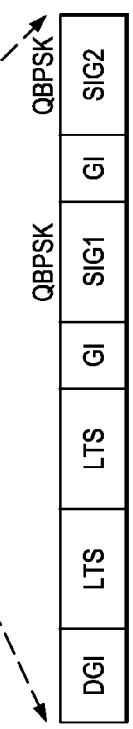
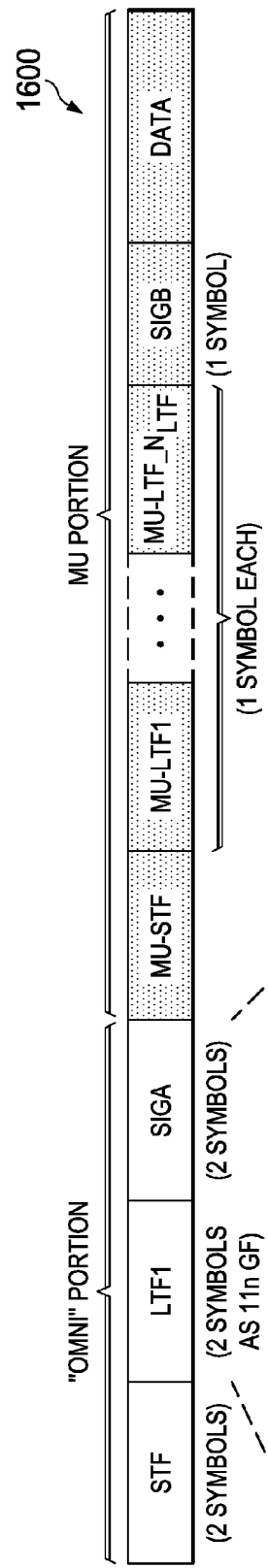
FIG. 16
(PRIOR ART)

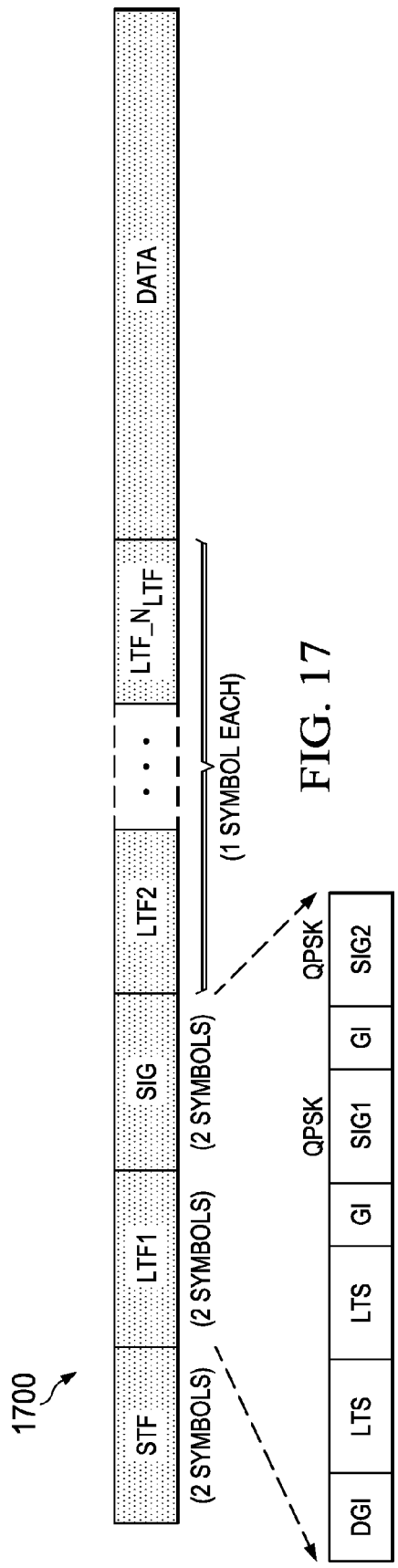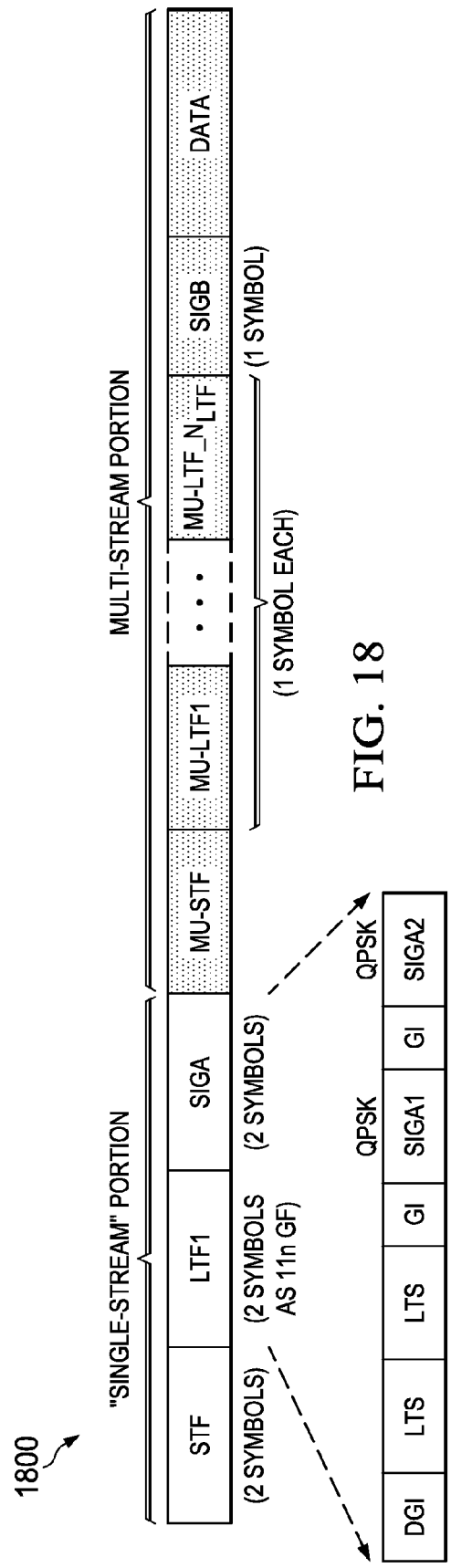

DUAL-STREAM SIGNAL (SIG) FIELD ENCODING WITH HIGHER ORDER MODULATION

This application claims the benefit of U.S. Provisional Application No. 61/601,297 filed on Feb. 21, 2012, entitled "System and Method for a QPSK Signal Field," and U.S. Provisional Application No. 61/660,505 filed on Jun. 15, 2012, entitled "System and Method for a Wireless Preamble Using STBC," both of which are incorporated herein by reference as if reproduced in their entireties.

TECHNICAL FIELD

The present invention relates to a system and method for wireless communications, and, in particular embodiments, to dual-stream signal (SIG) field encoding with higher order modulation.

BACKGROUND

Institute of Electrical and Electronics Engineers (IEEE) standards publications 802.11 outline protocols for implementing wireless local area networks (WLAN), and sets forth a physical (PHY) layer frame format that includes a preamble portion carrying control data and a payload portion carrying data. The preamble portion may include an omnidirectional portion that is transmitted using one stream, as well as a beamformed portion that is transmitted using multiple streams. The omnidirectional portion of the preamble carries a variety of preamble fields, including a legacy short training field (L-STF), a legacy long training field (L-LTF), a legacy signal (L-SIG) field, and a very high throughput (VHT) SIG field. The beamformed portion of the preamble also includes a variety of fields, including VHT long training fields (VHT LTFs) and VHT short training fields (VHT STFs).

SUMMARY

Technical advantages are generally achieved, by embodiments of this disclosure which describe dual-stream SIG field encoding with higher order modulation.

In accordance with an embodiment, a method for communicating in a wireless network is provided. In this example, the method includes encoding signal (SIG) field data in accordance with a space-time block code (STBC) encoding scheme to obtain an encoded SIG field, and transmitting the encoded SIG field in a preamble of a frame. An apparatus for performing this method is also provided.

In accordance with another embodiment, another method for communicating in a wireless network is provided. In this example, the method includes generating a signal (SIG) field using two transmit streams, and transmitting the SIG field in a preamble of a frame. An apparatus for performing this method is also provided.

In accordance with yet another embodiment, a method for wireless communication is provided. In this example, the method includes generating a signal (SIG) field, modulating the SIG field in accordance with a quadrature phase-shift keying (QPSK) modulation scheme, and transmitting the modulated SIG field in a frame over a network. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 7 illustrates a diagram of yet another embodiment packet format;

FIG. 8 illustrates a diagram of yet another embodiment packet format;

FIG. 9 illustrates a chart of an STBC encoding format;

FIG. 10 illustrates a chart of an STBC decoding format;

FIG. 14 illustrates a flowchart of an embodiment method for modulating a SIG field;

FIG. 15 illustrates a diagram of a prior art preamble format;

FIG. 16 illustrates a diagram of another prior art preamble format;

FIG. 17 illustrates a diagram of an embodiment preamble format;

FIG. 18 illustrates a diagram of another embodiment preamble format;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Notably, the SIG field(s) (legacy, VHT, or otherwise) specify parameters of the frame needed for reception (e.g., frame rate, frame length, etc.), and therefore are typically transmitted in the omnidirectional portion of the preamble. Because conventional IEEE 802.11 networks typically use single stream encoding for all omnidirectional preamble fields, SIG fields are typically encoded using one space-time stream. Accordingly, SIG fields in conventional IEEE 802.11 frames are limited to binary phase shift keying (BPSK) modulation schemes, which have relatively low-data rates when compared to higher order modulation schemes. However, next generation networks may require increased SIG field capacity, and, as a result, new SIG field encoding/transmission techniques are desired.

Aspects of this invention increase SIG field capacity by encoding a SIG field using two streams using, for example, a space-time block code (STBC) encoding scheme, which allows for the utilization of higher order modulation schemes, e.g., quadrature phase-shift keying (QPSK), to achieve increased SIG field capacity. In embodiments, dual-stream encoded SIG fields are transmitted using an omnidirectional beam, thereby allowing mobile stations to accurately decode the SIG field irrespective of their spatial location.

Figure 1:
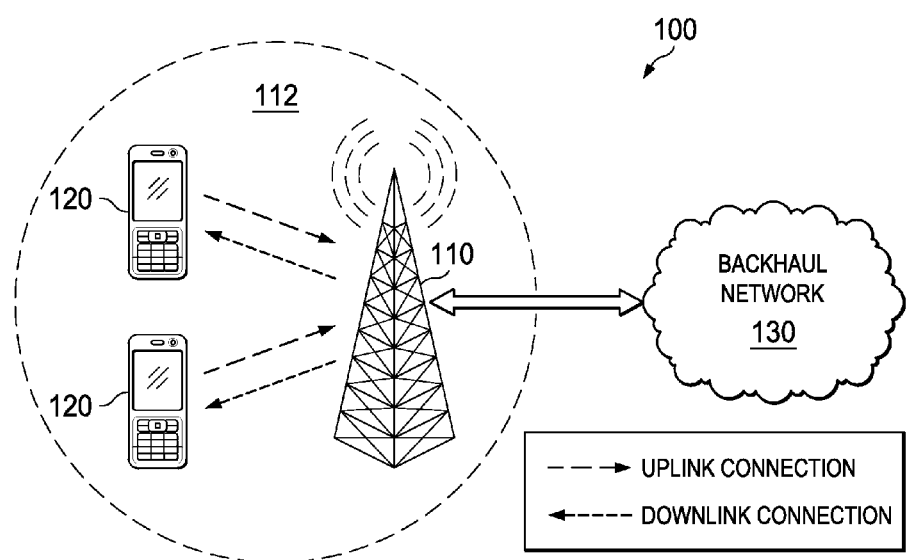
FIG. 1 illustrates diagram of a wireless network for communicating data.

FIG. 1 illustrates a network 100 for communicating data. The network 100 comprises an access point (AP) 110 having a coverage area 112, a plurality of user equipments (UEs) 120, and a backhaul network 130. The AP 110 may comprise any component capable of providing wireless access by, inter alia, establishing uplink (dashed line) and/or downlink (dotted line) connections with the UEs 120, such as a base station, an enhanced base station (eNB), a femtocell, and other wirelessly enabled devices. The UEs 120 may comprise any component capable of establishing a wireless connection with the AP 110. The backhaul network 130 may be any component or collection of components that allow data to be exchanged between the AP 110 and a remote end (not shown). In some embodiments, the network 100 may comprise various other wireless devices, such as relays, femtocells, etc.

Figures 2, 3:
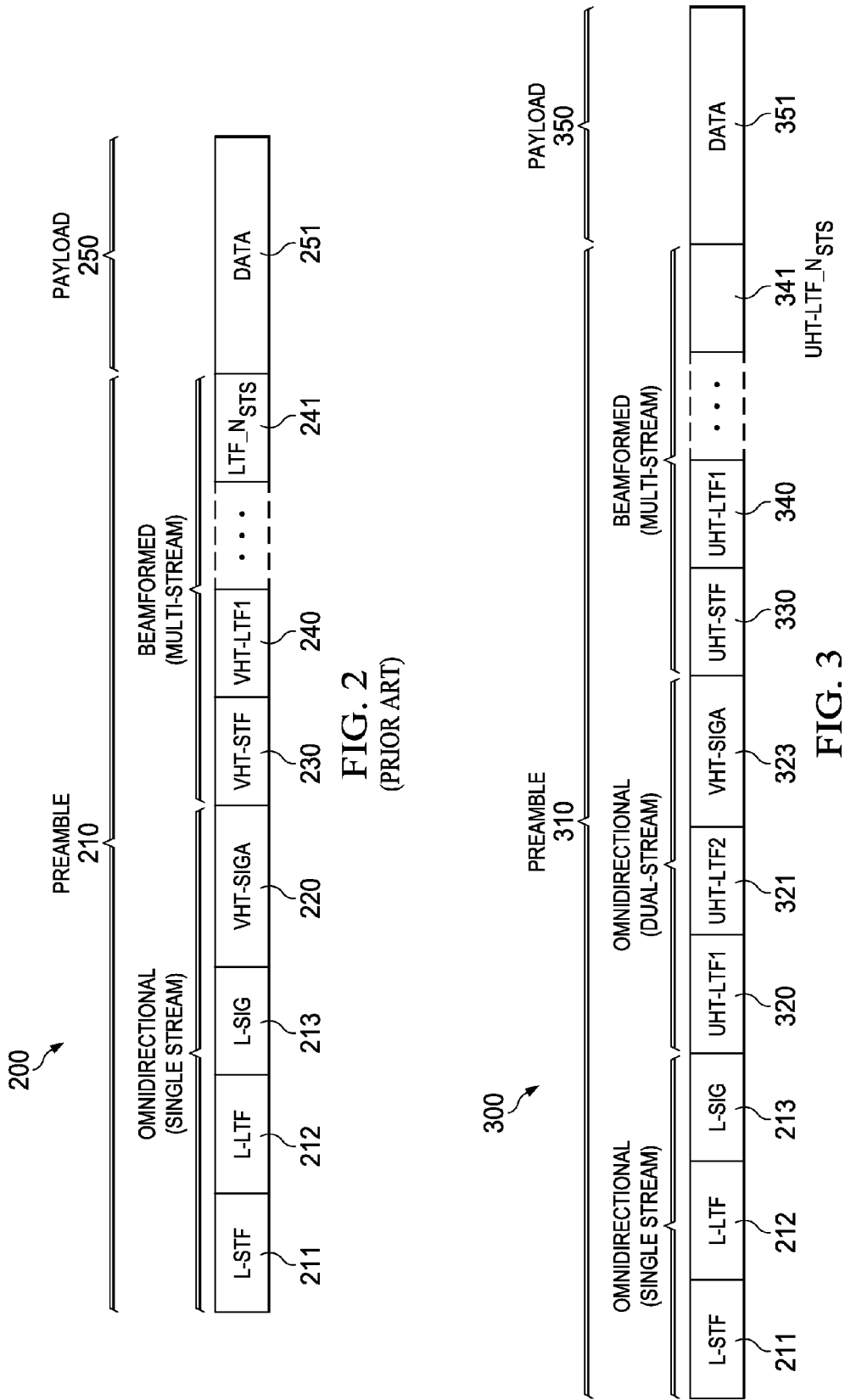
FIG. 2 illustrates a diagram of a prior art frame.
FIG. 3 illustrates a diagram of an embodiment frame including a dual-stream encoded SIG field.

FIG. 2 illustrates a prior art frame 200 communicated in accordance with conventional IEEE 802.11 protocols. As shown, the prior art frame 200 comprises a preamble 210 and a payload 250. The preamble 210 carries an L-STF field 211, an L-LTF 212, an L-SIG field 213, a VHT SIG field 220 in an omnidirectional portion of the preamble 210, as well as an VHT-STF field 230 and a plurality of VHT-LTF fields 240-241 in a beamformed portion of the preamble 210. Notably, all fields in the omnidirectional portion of the preamble 210 (i.e., including the L-SIG field 213 and the VHT SIG field 220) are encoded using a single stream, and therefore are modulated using BPSK. The payload 250 carries data 251.

The carrying capacity of SIG fields can be increased through dual-stream encoding. FIG. 3 illustrates an embodiment frame 300 communicated in accordance with one or more aspects of this disclosure. As shown, the embodiment frame 300 includes a first ultra-high throughput (UHT) LTF (UHT-LTF1) 320, a second UHT LTF (UHT-LTF2) 321, and a SIG field 323, each of which are dual-stream encoded and transmitted in accordance with an omni-directional beam. Additionally, the embodiment frame 300 includes a single stream portion comprising the L-STF field 211, the L-LTF field 212, and the L-SIG field 213, as well as beamformed multi-stream portion including an UHT-STF field 330, and a plurality of UHT-LTF fields 340-341. Although the SIG field 323 is depicted as an UHT-SIG field, the SIG field 323 may indeed be any type of SIG field. In the embodiments, the SIG field 323 may be encoded in accordance with STBC encoding technique. Additionally, the SIG field 323 may be modulated in accordance with a higher order modulation scheme, e.g., QPSK, etc. In embodiments, the SIG field 323 is transmitted using a omnidirectional beam.

Figure 4:
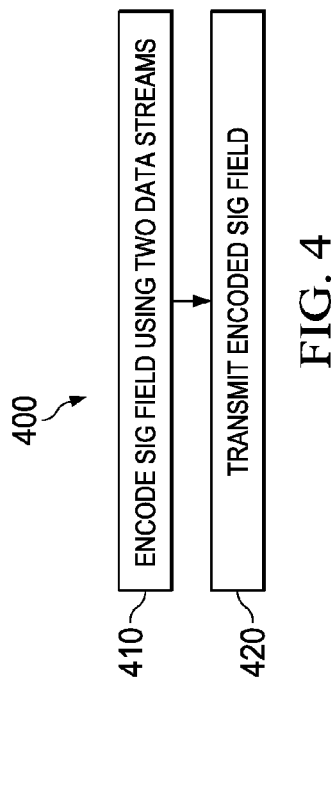
FIG. 4 illustrates a flowchart of an embodiment method for communicating a dual-stream encoded SIG field.

FIG. 4 illustrates an embodiment method 400 for communicating a SIG field, as might be performed by a transmitter. The method 400 begins at step 410, where the transmitter encodes SIG field data using two data streams to obtain an encoded SIG field. The method 400 then proceeds to step 420, where the transmitter transmits the encoded SIG field. Embodiments may utilize achieve dual steam encoding via an STBC encoding technique to achieve a more robust communication. In an embodiment, higher modulation order such as QPSK can be used for the constellation-mapping of the SIG field, which increases the carrying capacity of the SIG field.

In an embodiment, a two transmit (TX) stream access point (AP) and a two receive (RX) stream station (STA) may achieve a ten decibel (dB) signal-to-noise ratio (SNR) increase in packet error rate (PER) performance over a conventional a single stream preamble. In an embodiment, the bit size of the SIG field is doubled with the QPSK constellation. In an embodiment, the increased SIG field size may allow some of the MAC information to be carried in PHY SIG field.

Embodiments may be implemented in cellular networks and devices, Wi-Fi networks, heterogeneous networks between cellular networks and Wi-Fi networks, such as Wi-Fi APs, cellular base stations, stations, mobile devices, user equipment, and the like.

Figure 5:
FIG. 5 illustrates a diagram of an embodiment packet format.
Figure 6:
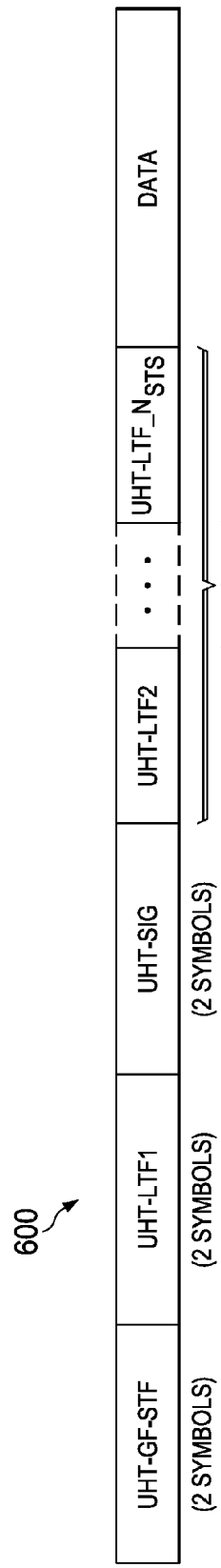
FIG. 6 illustrates a diagram of another embodiment packet format.

Embodiment IEEE 802.11 packet formats are provided herein. FIG. 5 illustrates a mixed mode packet format 500, which considers backward compatibility. FIG. 6 illustrates a green field packet format classic type.

With respect to the green field frame format for the next generation WLAN standard (WNG standards), backward compatibility is not typically an issue and multiple streams may be available. An embodiment uses two streams for an STBC encoding in the green field frame formats of WNG. The design flow of short training field (STF) may be similar to existing WLAN systems. Because there are two streams for the preamble, two long training fields (LTF) symbols are used before the SIG field. The long training sequences (LTSs) are mapped tone by tone with the 2×2 P-matrix given in the current WLAN specification, then mapped with a cyclic delay diversity (CDD) matrix, and then spatially mapped to the TX antennas. The beamforming with the spatial mapping is omnidirectional. The resulting size of LTFs tone by tone is 2×2 in time and space. The same STBC encoding scheme from Table 19-18 of IEEE draft P802.11-REVmb can be taken for the $N_{SS}=1$ and $N_{STS}=2$ case. IEEE draft P802.11-REVmb is incorporated herein by reference as if reproduced in its entirety. FIG. 7 illustrates an embodiment green field packet format 700 using STBC. Additionally, FIG. 8 illustrates another embodiment green field packet format 800 using STBC.

With a next generation WLAN standard called an ultra-high throughput (UHT) WLAN, an embodiment TX design flow for the UHT-GF-STF, UHT-LTF1, UHT-LTF2, UHT-SIGA is described below. For UHT-GF-STF, the single stream non-zero tones are mapped to space-time streams using the first column of P matrix, the same P matrix given in IEEE 802.11ac. CDD is applied for mapping to different antennas. For UHT-LTF1 and UHT-LTF2, the long training sequence is mapped from two space-time streams to two LTFs, LTF1 and LTF2 using the P matrix. The mapping may be performed in accordance with the following formula: $[LTF1_k, LTF2_k]_{N_{TX} \times 2} = Q_k D_{CDD}^{(k)} P_{2 \times 2} s_k$, where $$P_{2 \times 2} = \begin{bmatrix} 1 & -1 \\ 1 & 1 \end{bmatrix},$$

$s_k$ is a LTS in tone k, $Q_k$ is a spatial mapping matrix between two streams and $N_{TX}$ with omnidirectional beam, and $D_{CDD}^{(k)}$ is a diagonal cyclic-delay diversity (CDD) phase shift matrix in tone k, of size 2×2.

Figure 11:
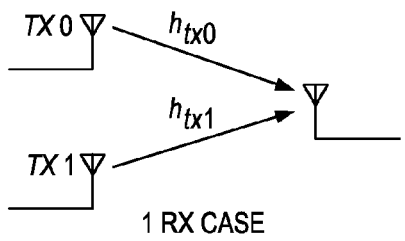
FIG. 11 illustrates a diagram of a single receiver communication format.
Figure 12:
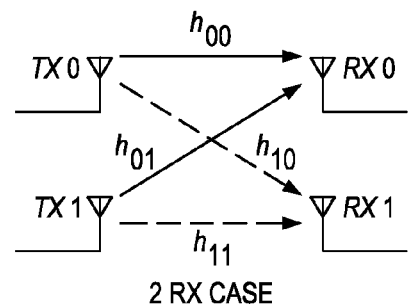
FIG. 12 illustrates a diagram of a multi-receiver communication format.

For STBC encoding, UHT-SIGA is encoded using STBC according to Table 19-18 of IEEE draft P802.11-REVmb. For STBC with $N_{SS}=1$ and $N_{STS}=2$, as shown in FIG. 9, k represents a tone, and i represents a time index. Since the SIGA field has two OFDM symbols, SIGA1 and SIGA2, the QAM symbols on the same tone of both SIGA1 and SIGA2 form the $s_{k,1,2t}$ and $s_{k,1,2t+1}$ pair, that is, $s_k$ on the SIGA1 is $s_{k,1,2t}$, and the $s_k$ on SIGA2 is $s_{k,1,2t+1}$. For STBC decoding, simply expressing the STBC encoding in the TX as shown in FIG. 10, and describing the channel models for 1 RX and 2 RX cases as shown in FIGS. 11-12, the received signals are given in the following equations for the 1 RX and 2 RX cases. For the 1 RX case shown in FIG. 11, the received signal ($y_{t_0}$) at $t_0$ is $y_{t_0} = s_0 h_{tx0} - s_1^* h_{tx1}$ and the received signal ($y_{t_1}$) at $t_1$ is $y_{t_1} = s_1 h_{tx0} + s_0^* h_{tx1}$. For the 2 RX case shown in FIG. 12, the received signal ($y_{t_0,rx0}$) at $t_0$ with rx0, at $t_0$ is $y_{t_0,rx0} = s_0 h_{00} - s_1^* h_{01}$, the received signal ($y_{t_0,rx1}$) at to with rx1 is $y_{t_0,rx1} = s_0 h_{10} - s_1^* h_{11}$, the received signal ($y_{t_1,rx0}$) at $t_1$ with rx0 is $y_{t_1,rx0} = s_1 h_{00} + s_0^* h_{01}$, and the received signal ($y_{t_1,rx1}$) at $t_1$ with rx1 is $y_{t_1,rx1} = s_1 h_{10} + s_0^* h_{n}$. The detected signal (S) in STBC decoding is obtained as follows, based on the notations above. For 1 RX case, $\tilde{s}_0 = h_{tx0}^* y_{t_0} + h_{tx1} y_{t_1}^*$ and $\tilde{s}_1 = -h_{tx1} y_{t_0}^* + h_{tx0}^* y_{t_1}$, where $\tilde{s}_0$ and $\tilde{s}_1$ are the STBC detection of signal $s_0$ and $s_1$. For 2 RX case, $\tilde{s}_0 = h_{00}^* y_{t_0,rx0} + h_{01} y_{t_0,rx0}^* + h_{10} y_{t_0,rx1}^* + h_{11} y_{t_1,rx1}^*$ and $\tilde{s}_1 = h_{10}^* y_{t_1,rx1} - h_{11} y_{t_0,rx1}^* + h_{00} y_{t_0,rx1}^* - h_{01} y_{t_1,rx0}^*$.

Figure 13:
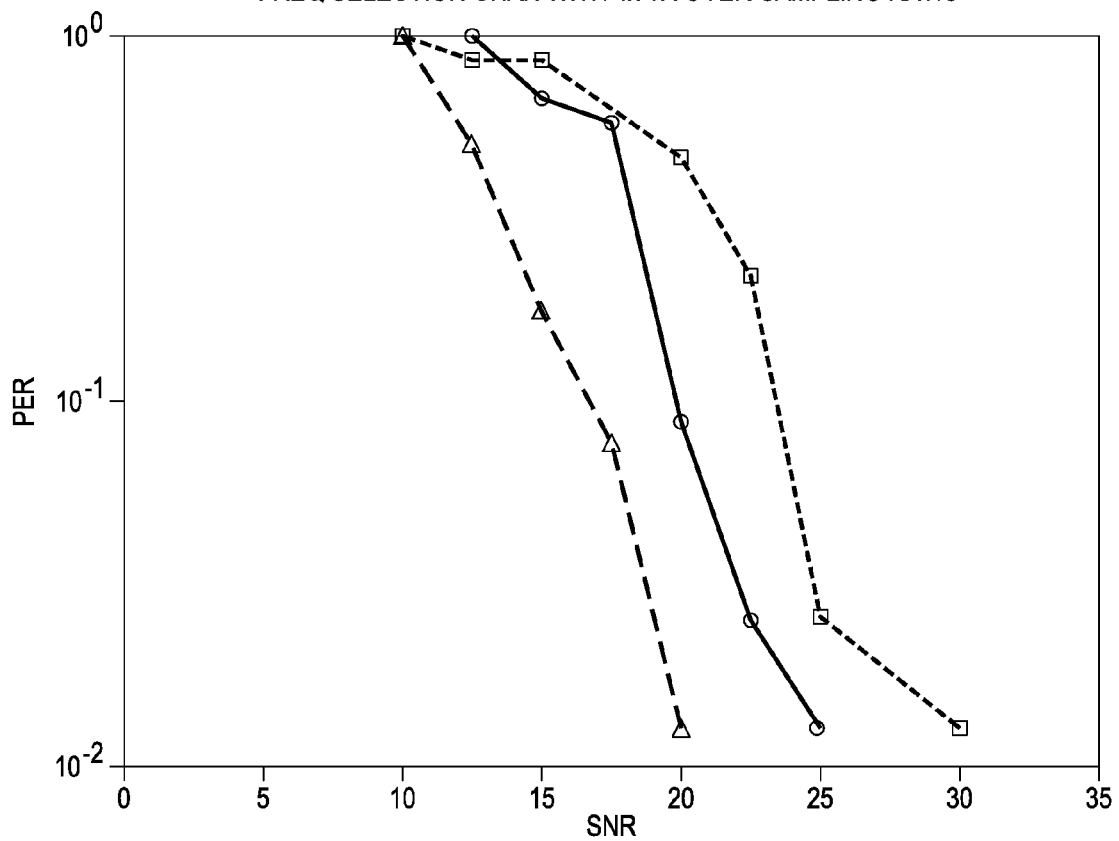
FIG. 13 illustrates a graph depicting performance comparisons for preamble transmission with SIG field STBC encoding.

A performance comparison is shown in FIG. 13. Using two streams for STBC encoding, with the preamble format and the TX design flow described above, it was observed about 10 dB maximum over the existing preamble format. This performance improvement allows the use of QPSK modulation for the SIG field in an embodiment.

In some embodiments, a transmitter may modulate the SIG field in accordance with quadrature phase-shift keying (QPSK) constellation mapping. When compared to BPSK constellation mapping, QPSK constellation mapping may increase the carrying capacity of the SIG field without changing the number of tones. FIG. 14 illustrates an embodiment method 1400 for modulating a SIG field, as might be performed by a transmitter. The method 1400 begins at step 1410, where the transmitter modulates a SIG field in accordance with a QPSK modulation scheme to obtain a modulated SIG field. The method 1400 then proceeds to step 1420, where the transmitter transmits the modulated SIG field.

In an embodiment, constellation size for the SIG field in the 20 MHz preamble of both green field and mixed mode packet formats is increased from BPSK (or QBPSK) to QPSK. In an embodiment, additional information such as transmit (TX) power level, scheduling information of the next transmission, etc. can be carried in the extended SIG field. An embodiment includes a QPSK constellation mapping for the SIG field to increase the SIG size so that more information can be carried in the SIG field. Embodiments may be applied to cellular networks and devices, such as cellular base stations, and to Wi-Fi networks and devices, such as Wi-Fi access points (APs).

FIG. 15 illustrates a prior art preamble 1500 for a 20 megahertz (MHz) Green Field (GF) packet format, while FIG. 16 illustrates a prior art preamble 1600 for 20 MHz multi-user (MU) mixed mode (MM) packet format.

FIG. 17 illustrates an embodiment preamble 1700 for the 20 MHz GF packet format and FIG. 18 illustrates an embodiment preamble 1800 for 20 MHz MU MM packet format.

The embodiment preambles 1700-1800 comprise a constellation size QPSK, while the prior art preambles 1500-1600 comprise a constellation size of SIG of BPSK. The two LTFs and two SIG symbols both in GF and MM format a 64 fast Fourier Transform (FFT) orthogonal frequency division multiplexed (OFDM) symbols.

The type of the original constellation, QBPSK or BPSK, played a role of auto detection between GF and MM modes, but this feature is no longer available with the change in 64 FFT QPSK for both SIG1 and SIG2. The GF and MM mode can be indicated in the SIG field instead. With the change from 64 FFT BPSK to 64 FFT QPSK in both SIG1 and SIG2 (GF mode case; SIGA1 and SIGA2 in case of MM mode), the bit size of the SIG field with QPSK is doubled from current 48 bits to 96 bits.

The additional information can be carried in the increased SIG bits. Some of the information that is in the media access control (MAC) header can move out to PHY SIG field, and some additional features such as TX power level, etc., can be carried in the SIG field. These advantages are made possible without changing any preamble format or OFDM tone mapping, scheduling or orientation. Instead, increasing the size of constellation in the SIG field is changed to QPSK, which increases the bit size of SIG field.

Figure 19:
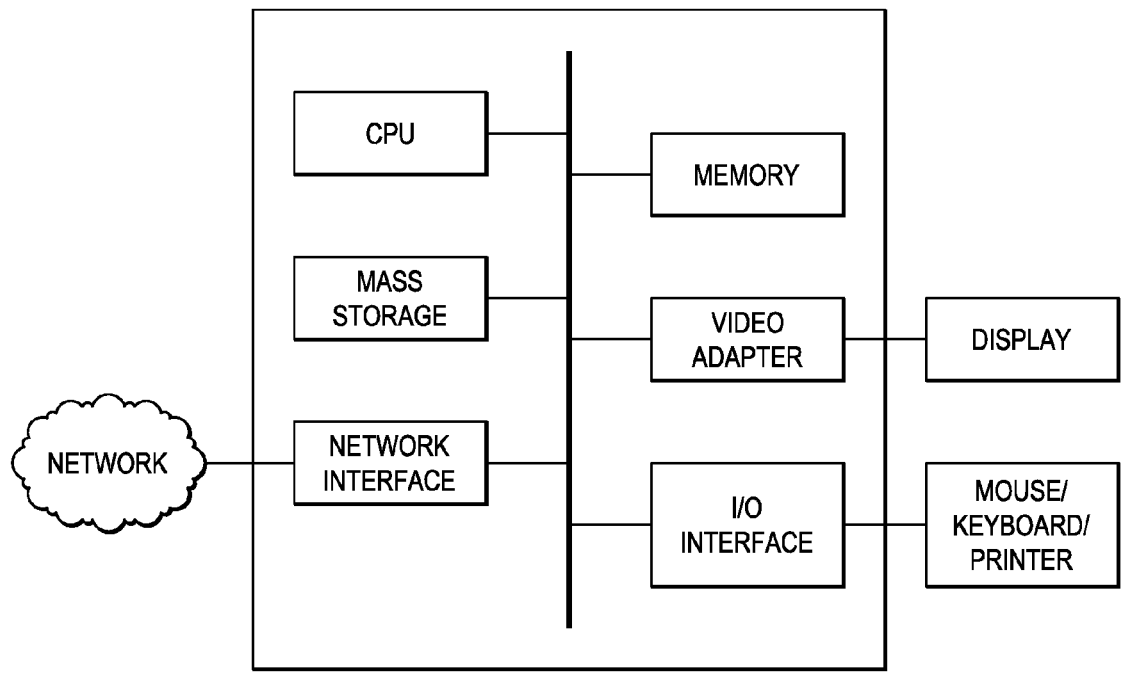
FIG. 19 illustrates a diagram of an embodiment computing platform.

FIG. 19 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 20:
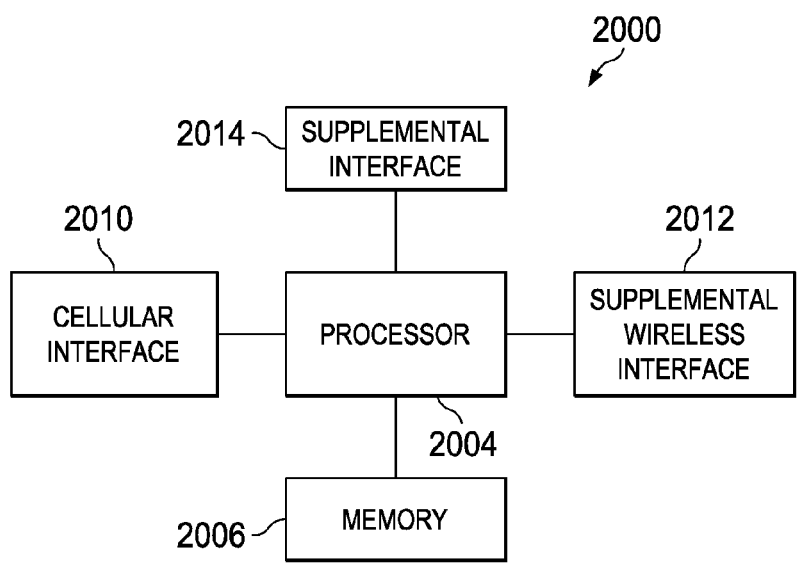
FIG. 20 illustrates a diagram of an embodiment communications device.

FIG. 20 illustrates a block diagram of an embodiment of a communications device 2000, which may be equivalent to one or more devices (e.g., UEs, NBs, etc.) discussed above. The communications device 2000 may include a processor 2004, a memory 2006, a cellular interface 2010, a supplemental wireless interface 2012, and a supplemental interface 2014, which may (or may not) be arranged as shown in FIG. 20. The processor 2004 may be any component capable of performing computations and/or other processing related tasks, and the memory 2006 may be any component capable of storing programming and/or instructions for the processor 2004. The cellular interface 2010 may be any component or collection of components that allows the communications device 2000 to communicate using a cellular signal, and may be used to receive and/or transmit information over a cellular connection of a cellular network. The supplemental wireless interface 2012 may be any component or collection of components that allows the communications device 2000 to communicate via a non-cellular wireless protocol, such as a Wi-Fi or Bluetooth protocol, or a control protocol. The device 2000 may use the cellular interface 2010 and/or the supplemental wireless interface 2012 to communicate with any wirelessly enabled component, e.g., a base station, relay, mobile device, etc. The supplemental interface 2014 may be any component or collection of components that allows the communications device 2000 to communicate via a supplemental protocol, including wire-line protocols. In embodiments, the supplemental interface 2014 may allow the device 2000 to communicate with another component, such as a backhaul network component.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for communicating in a wireless network, the method comprising:
   encoding a portion of signal (SIG) field data in accordance with a single-stream encoding scheme to obtain a single-stream encoded SIG field;
   encoding another portion of the SIG field data in accordance with a space-time block code (STBC) encoding scheme to obtain a dual-stream encoded SIG field; and
   transmitting the single-stream encoded SIG field and the dual-stream encoded SIG field in an omnidirectional portion of a preamble of a frame.

2. The method of claim 1, wherein the transmitting the single-stream encoded SIG field and the dual-stream encoded SIG field in the preamble of the frame comprises:
   transmitting the single-stream encoded SIG field and the dual-stream encoded SIG field using an omnidirectional beam.

3. The method of claim 1, wherein the encoding the another portion of the SIG field data in accordance with the STBC encoding scheme comprises encoding the another portion of the SIG field data using two transmit streams.

4. The method of claim 3, further comprising:
   transmitting two long training fields (LTFs) in the preamble of the frame, wherein the two LTFs are positioned before the dual-stream encoded SIG field, wherein the two LTFs provide channel estimation for the two transmit streams.

5. An apparatus for transmitting data, the apparatus comprising:
   a processor; and
   a computer readable storage medium coupled to the processor and storing programming for execution by the processor, the programming including instructions to:
      encode a portion of signal (SIG) field data in accordance with a single-stream encoding scheme to obtain a single-stream encoded SIG field,
      encode another portion of the SIG field data in accordance with a space-time block code (STBC) encoding scheme to obtain a dual-stream encoded SIG field, and
      transmit the single-stream encoded SIG field and the dual-stream encoded SIG field in an omnidirectional portion of a preamble of a frame.

6. A method for communicating in a wireless network, the method comprising:
   generating, by a communications device, a legacy signal (SIG) field using a single transmit stream;
   generating, by the communications device, a very-high throughput (VHT) SIG field using two transmit streams; and
   transmitting the legacy SIG field and the VHT SIG field in an omnidirectional portion of a preamble of a frame.

7. The method of claim 6, wherein the transmitting comprises transmitting the VHT SIG field using an omnidirectional beam.

8. The method of claim 6, wherein the generating the VHT SIG field comprises encoding SIG field data in accordance with a space-time block code (STBC) encoding scheme.

9. The method of claim 6, wherein the generating the VHT SIG field comprises:
   encoding SIG field data in accordance with a space-time block code (STBC) encoding scheme to generate the two transmit streams;
   mapping the two transmit streams to two transmit antennas; and
   transmitting the two transmit streams over the two transmit antennas during a time-frequency resource reserved for the VHT SIG field.

10. An apparatus for transmitting data, the apparatus comprising:
    a processor; and
    a computer readable storage medium coupled to the processor and storing programming for execution by the processor, the programming including instructions to:
       generate a legacy signal (SIG) field using a single transmit stream,
       generate a very-high throughput (VHT) SIG field using two transmit streams, and
       transmit the legacy SIG field and the VHT SIG field in an omnidirectional portion of a preamble of a frame.

11. The apparatus of claim 10, wherein the instructions to transmit the VHT SIG field include instructions to transmit the VHT SIG field using an omnidirectional beam.

12. The apparatus of claim 10, wherein the instructions to generate the VHT SIG field include instructions to encode SIG field data in accordance with a space-time block code (STBC) encoding scheme to generate the VHT SIG field.

13. The apparatus of claim 10, wherein the instructions to generate the VHT SIG field includes instructions to:
    encode SIG field data in accordance with a space-time block code (STBC) encoding scheme to generate the two transmit streams;
    map the two transmit streams to two transmit antennas; and transmit the two transmit streams over the two transmit antennas during a time-frequency resource reserved for the VHT SIG field.

14. A method for wireless communication, the method comprising:
generating very-high throughput (VHT) signal (SIG) field data and legacy SIG field data;
encoding the legacy SIG field data in accordance with a single-stream encoding scheme to generate a legacy SIG field;
modulating the legacy SIG field in accordance with a binary phase shift keying (BPSK) modulation scheme;
encoding the VHT SIG field data in accordance with a space-time block code (STBC) encoding scheme to generate a VHT SIG field;
modulating the VHT SIG field in accordance with a quadrature phase-shift keying (QPSK) modulation scheme; and
transmitting the modulated legacy SIG field and the modulated VHT SIG field in an omnidirectional portion of a preamble of a frame over a network.

15. The method of claim 14, wherein generating the VHT SIG field comprises generating the VHT SIG field using two transmit streams.

16. The method of claim 14, wherein the encoding the VHT SIG field data comprises:
encoding the VHT SIG field data in accordance with the STBC encoding scheme to generate two transmit streams;
mapping the two transmit streams to two transmit antennas; and
transmitting the two transmit streams over the two transmit antennas during a time-frequency resource reserved for the VHT SIG field.

17. The method of claim 14, wherein the VHT SIG field includes a single-user/multi-user (SU/MU) indication specifying whether the frame is destined for a single receiver or multiple receivers.

18. The method of claim 14, wherein the generating the VHT SIG field data comprises determining a transmit power level.

19. The method of claim 14, wherein the generating the VHT SIG field data comprises determining scheduling information of a next transmission in the VHT SIG field.

20. The method of claim 14, wherein the modulated VHT SIG field has a twenty megahertz (MHz) bandwidth, and wherein the VHT SIG field comprises a length of 96 bits.

21. An apparatus for transmitting data, the apparatus comprising:
a processor; and
a computer readable storage medium coupled to the processor and storing programming for execution by the processor, the programming including instructions to:
generate legacy signal (SIG) field data and very-high throughput (VHT) SIG field data;
encode the legacy SIG field data in accordance with a single-stream encoding scheme to generate a legacy SIG field;
modulate the legacy SIG field in accordance with a binary phase shift keying (BPSK) modulation scheme;
encode the VHT SIG field data in accordance with a space-time block code (STBC) encoding scheme to generate a VHT SIG field;
modulate the VHT SIG field in accordance with a quadrature phase-shift keying (QPSK) modulation scheme; and
transmit the modulated VHT SIG field and the modulated legacy SIG field in an omnidirectional portion of a preamble of a frame over a network.

* * * * *

UNITED STATES PATENT AND TRADEMARK OFFICE
CERTIFICATE OF CORRECTION

PATENT NO. : 9,001,930 B2  
APPLICATION NO. : 13/771356  
DATED : April 7, 2015  
INVENTOR(S) : Suh et al.

Page 1 of 1

It is certified that error appears in the above-identified patent and that said Letters Patent is hereby corrected as shown below:

Title Page, Item (72) Inventor is corrected to read:
-- Jung Hoon Suh, Kanata (CA);
Osama Aboul-Magd, Kanata (CA);
Kwok Shum Au, Shenzhen (CN);
Sheng Sun, Kanata (CA) --.

Signed and Sealed this
Fifteenth Day of December, 2015

Michelle K. Lee
*Director of the United States Patent and Trademark Office*